United States Patent [19]

Kolenc et al.

[11] Patent Number: 4,671,490
[45] Date of Patent: Jun. 9, 1987

[54] DIAPHRAGM VALVE

[75] Inventors: Terrence J. Kolenc, Mentor; Gary W. Scheffel, Streetsboro, both of Ohio

[73] Assignee: Nupro Co., Willoughby, Ohio

[21] Appl. No.: 863,714

[22] Filed: May 16, 1986

[51] Int. Cl.⁴ .............................................. F16K 31/00
[52] U.S. Cl. .................................. 251/335.2; 251/267; 251/357
[58] Field of Search ...................... 251/357, 335.2, 268, 251/267

[56] References Cited

U.S. PATENT DOCUMENTS

| | | | |
|---|---|---|---|
| 933,863 | 9/1909 | Thompson | 251/333 |
| 970,281 | 9/1910 | Van Nostran | 251/268 |
| 1,316,585 | 9/1919 | Logan | 251/269 |
| 1,844,528 | 2/1932 | Smith | 251/331 |
| 1,996,309 | 4/1935 | Simpson | 251/268 |
| 2,051,350 | 4/1936 | Smith | 251/335.2 |
| 2,213,998 | 9/1940 | Sifkovitz | 251/268 |
| 2,358,785 | 9/1944 | Blizard | 122/479 |
| 2,362,438 | 11/1944 | Marsh | 251/335.2 |
| 2,448,429 | 8/1948 | Henry | 137/510 |
| 2,457,492 | 12/1948 | Rayboud | 251/357 |
| 2,527,381 | 10/1950 | St. Clair | 251/357 |
| 2,969,218 | 1/1961 | Shaw | 251/357 |
| 3,072,150 | 1/1963 | Hastings et al. | 251/333 |
| 3,198,481 | 8/1965 | Bryant | 251/333 |
| 3,354,831 | 11/1967 | Acker et al. | 92/99 |
| 3,451,423 | 6/1969 | Priese | 137/556 |
| 3,529,622 | 9/1970 | Weise et al. | 251/332 |
| 3,605,793 | 9/1971 | Kinsel | 251/333 |
| 3,765,448 | 10/1973 | Duassia | 137/553 |
| 3,874,636 | 4/1975 | Bake et al. | 251/335.2 |
| 4,161,278 | 7/1979 | Klann et al. | 92/103 M |
| 4,171,792 | 10/1979 | Bass | 251/335.2 |

FOREIGN PATENT DOCUMENTS

| | | |
|---|---|---|
| 217705 | 11/1965 | Australia . |
| 654060 | 12/1962 | Canada . |
| 1000201 | 1/1957 | Fed. Rep. of Germany . |
| 1076458 | 2/1960 | Fed. Rep. of Germany . |
| 1196482 | 11/1959 | France . |
| 7407994 | 12/1974 | Netherlands . |
| 107153 | 9/1963 | United Kingdom . |

OTHER PUBLICATIONS

D. J. Steger, "Actuator with Wall Flexure Control," IBM Tech. Disclosure Bul., vol. 15, No. 3, Aug. 1972.

Primary Examiner—A. Michael Chambers
Attorney, Agent, or Firm—Fay, Sharpe, Fagan, Minnich & McKee

[57] ABSTRACT

A diaphragm valve which uses a multiple annular metal diaphragm welded about its inner periphery to a valve operating stem. The diaphragm is sealingly clamped about its outer periphery to the valve body and is also clamped about its inner periphery at a location spaced outwardly of the weld to prevent the weld from being subjected to flexure stresses during valve actuation. The actuating assembly is arranged to produce non-rotary, reciprocatory movement of the operating stem through a bonnet mounted rotary actuator. An improved stem tip seal arrangement is also disclosed.

20 Claims, 7 Drawing Figures

4,671,490

DIAPHRAGM VALVE

BACKGROUND OF THE INVENTION

The subject invention is directed toward the valve art and, more particularly, to the improved diaphragm-type valve.

Metal diaphragm valves are often used in systems handling toxic and dangerous fluids. The valves are preferred in such environments because the diaphragm can provide total hermetic sealing between the valve cavity and the valve operating mechanism.

As is apparent, the diaphragm is a very critical element in such valves since failure of the diaphragm can result in sudden escape of the dangerous fluids. It is generally recognized that the life of the diaphragm element is closely related to the types of stresses to which it is subjected during operation. Consequently, attempts have been made to improve not only the diaphragm element but, also, the manner in which it is mounted and actuated. Generally these attempts have significantly increased the complexity of the valves and/or the problems associated with their manufacture and maintenance.

The subject invention provides a diaphragm-type valve which includes a unique diaphragm construction and mounting arrangement which prevents the diaphragm from being subjected to any undesirable stresses and provides extremely long diaphragm life.

The invention also provides an improved operating mechanism which allows the diaphragm and the associated valve element to be moved between the open and closed positions without subjecting the diaphragm to torsional loads or the like. In addition, the operating mechanism provides a readily visual indication of the valve operating position.

The invention further concerns an improved valve stem tip assembly which is particularly suited for use in diaphragm valves as well as other types of shut-off valves.

BRIEF DESCRIPTION OF THE INVENTION

In accordance with one aspect of the invention, there is provided a diaphragm valve which includes a valve body having an opening that extends inwardly from the exterior of the body to define a generally cylindrical valve chamber. A valve operating stem member is positioned to extend axially into the valve chamber for engagement with a valve element. The valve chamber is sealed by an annular flexible metal diaphragm having an outer periphery which is clampingly joined to the body and an inner periphery welded to the stem circumferentially thereof. Actuating means are provided for selectively moving the stem axially of the valve chamber without applying torsional loads to the diaphragm. The actuating means include a bonnet member through which the stem extends with cooperating surfaces between the bonnet and the stem for permitting free axial movement of the stem while preventing axial rotation. A drive member is rotatably carried by the bonnet and has threads in engagement with corresponding threads formed on the stem. A bonnet nut surrounds the bonnet member and the drive member and is threaded into the body to clamp the bonnet member and the diaphragm into sealed engagement with the body. Carried by the nut member are means for continually biasing the drive member axially outwardly. In addition, a handle member is positioned over the bonnet member and is releasably joined to the drive member.

In accordance with another aspect of the invention, both the stem member and the nut member extend axially outwardly of the bonnet member and the stem member extends through an opening in the handle member so that the outer free end of the stem provides a visual indication of the position of the valve element.

In accordance with a still further aspect of the invention, there is provided a diaphragm valve of the general type described wherein the diaphragm means includes a plurality of relatively thin, annular metal members positioned in aligned, juxtaposed relationship. A valve operating stem member extends axially through the annular metal members and joined thereto by a continuous circumferential weld which extends about the inner periphery of the annular members to seal the members to the stem. First clamp means are provided for sealingly clamping the outer peripheral portion of the annular metal members to the body circumferentially of the valve chamber. Second clamp means are provided for clamping an inner peripheral portion of the diaphragm member to the stem circumferentially thereof. The second clamp means are arranged to engage and clamp the annular members at a point radially outwardly of the weld to prevent forces produced during flexure of the diaphragm from acting on the weld.

In accordance with another aspect, the second clamp means comprise a pair of clamp members positioned on axially opposite sides of the annular metal members. Each of the pair of clamp members are carried by the stem and have opposed surfaces which face the annular metal members and curve away from the annular members radially outwardly of their clamping point.

In accordance with yet another aspect of the invention, there is provided a stem tip seal arrangement particularly suited for use in diaphragm valves and comprising a valve member mounted for movement axially toward and away from an associated annular valve seat. The valve member includes a cylindrical end portion which extends axially from the valve member toward the seat. The diameter of the end portion is less than the inner open diameter of the seat. The end portion carries an annular rigid ring member which is slidably received thereon and which has an outer diameter greater than the inner diameter of the seat. A generally cylindrical sleeve is mounted for axial movement independent of the ring member and is carried by the valve member axially outwardly of the rigid ring member to define an annular chamber between the sleeve and the rigid ring member opening toward the seat. A resilient seal ring is located in the annular chamber and has an end face adapted to engage the seat as the valve member moves axially toward the seat. In addition, separate and more resilient means are located between the rigid ring and the valve member for allowing the rigid ring member to move axially relative to the seal ring and the sleeve and to allow the rigid ring to maintain contact with the seat while compressive forces between the seal ring and the seat increase.

In accordance with a still further object, the sleeve member has an end face configured to engage the seat with line contact as the valve member moves toward the seat. Further, the rigid ring member is also preferably configured to engage the seat with line contact in the area closely adjacent the resilient seal ring member.

Accordingly, the primary object of the invention is the provision of a diaphragm-type valve wherein the diaphragm means is welded and clamped to the operating stem in a manner which allows the weld to provide full hermetic sealing of the valve chamber while preventing flexure forces from acting against the weld.

A still further object is the provision of a diaphragm-type valve in which the operating mechanism permits free axial movement of the stem without transmitting any torsional loads through the stem to the diaphragm or the stem tip assembly.

Yet another object is the provision of a stem tip seal assembly which is particularly suited for use in diaphragm type valves and other shut-off valves.

The above and other objects and advantages will become apparent from the following description when read in conjunction with the accompanying drawings wherein.

Figure 1:
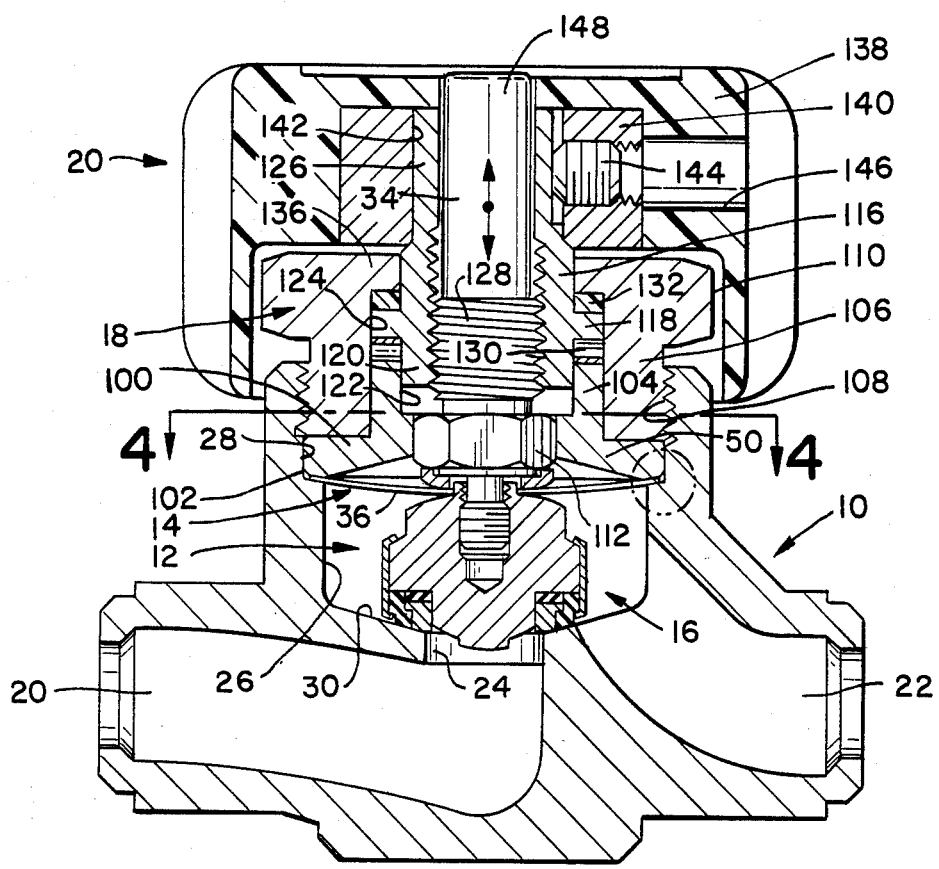
FIG. 1 is a cross-sectional view of a diaphragm valve incorporating the subject invention.

Referring more particularly to the drawings where the showings are for the purpose of illustrating a preferred embodiment of the invention only and not for the purpose of limiting same, FIG. 1 best shows the overall arrangement of a valve formed in accordance with the subject invention and generally comprising a main body 10 having a generally cylindrical internal valve chamber 12 which is sealed at its outer end by a diaphragm assembly 14. Positioned within the valve chamber 12 and arranged to control flow therethrough is a stem tip seal assembly 16. The valve is moved between its open and closed positions by an operating assembly 18 including a handle member 20.

In the embodiment under consideration, the main body 10 is formed of a suitable metal such as stainless steel and is provided with an inlet passage 20 and an outlet passage 22. As shown, inlet passage 20 terminates in an upwardly open port 24 which is axially aligned with the generally cylindrical valve chamber 12. As illustrated, the valve chamber 12 is preferably formed with a stepped bore which includes a first cylindrical section 26 and an outer, somewhat larger diameter section 28. The inner end of the valve chamber 12 terminates in a conically shaped, inclined bottom wall 30 which defines an annular valve seat area about port 24.

Figure 5:
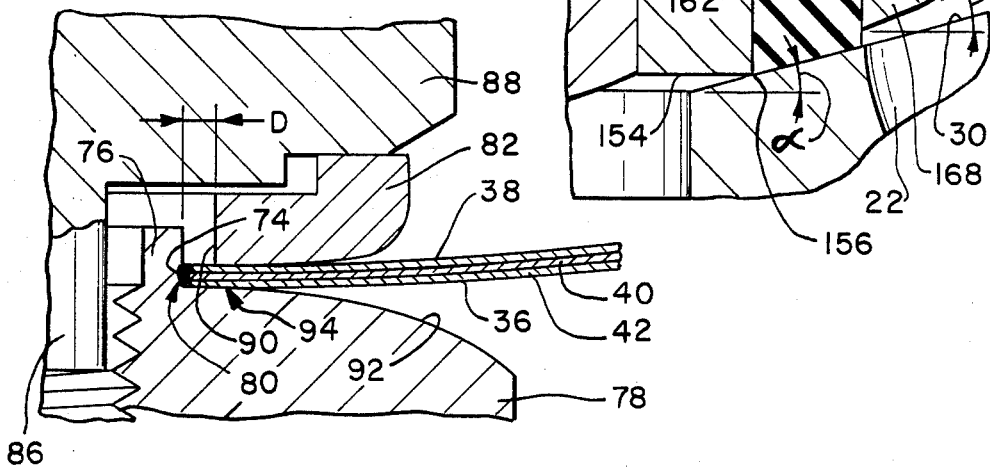
FIG. 5 is an enlarged view of the circled portion of FIG. 2.

Mounted to extend axially into the valve chamber 12 is an operating stem member 34 which has the stem tip seal member 16 carried on its inner end in a manner subsequently to be described. The valve chamber 12 is sealed by the previously mentioned diaphragm assembly 14. In the embodiment under consideration, the diaphragm assembly 14 comprises a multiple layer metal diaphragm element 36 which is formed generally as described in commonly assigned U.S. application Ser. No. 482,215, filed Apr. 5, 1983 for a VALVE, the disclosure of which is herein incorporated by reference. Broadly, the diaphragm 36 is, as shown in FIG. 5, formed as a plural layered diaphragm comprised of three separate annular metal disk elements 38, 40 and 42. As shown, the disk member 38, 40 and 42 are preferably of equal thickness and, as described in the aforementioned patent application, each diaphragm forming disk member preferably is formed from Austenitic 316 stainless steel which has been heat treated to a hardness of not less than about 38 on the Rockwell C Scale.

Referring again to FIG. 2, it will be noted that the diaphragm 36 has its outer peripheral portion 44 received on a shoulder 46 formed at the juncture between cylindrical bores 26, 28. The diaphragm 36 is sealingly clamped to shoulder 46 by bonnet member 50 in a manner subsequently to be described.

Figure 6:
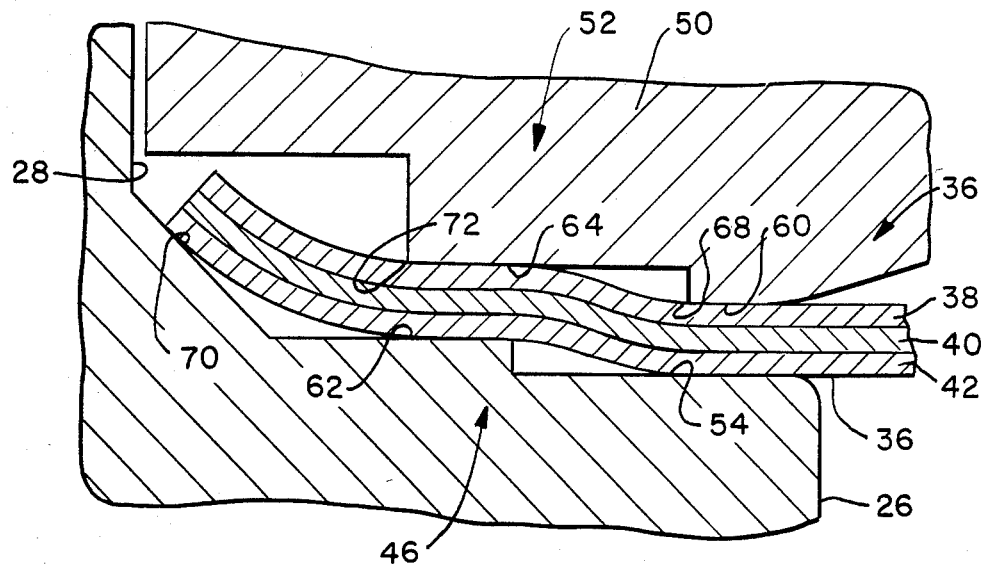
FIG. 6 is an enlarged cross-sectional view of the circled portion of FIG. 1; and, FIG. 7 is an enlarged cross sectional view like FIG. 6 but showing a modified arrangement for sealing the outer periphery of the diaphragm to the body.

Referring particularly to FIG. 6, the relationship between the shoulder 46 and the clamping face 52 of bonnet member 50 is shown in some detail. The particular clamping arrangement utilized is shown and described in more detail in the previously mentioned common assigned application. In general, however, shoulder 46 and bonnet clamping surface 52 are provided with spaced-apart opposite flat and parallel circumferential surface areas 54 and 60, respectively, which provide primary clamping surfaces to clamp and grip the diaphragm inwardly from its outer periphery. A second pair of flat and parallel clamping surfaces 62 and 64 are also provided to clamp the diaphragm at a position axially and radially spaced from the primary clamping surfaces 54 and 60. The primary and secondary surfaces are separated by relatively sharp corners 66 and 68 across which the diaphragm 36 is bent axially. The corners 66 and 68 provide excellent sealing against the opposite faces of diaphragm 36. Preferably, the machining tolerances for the surface 46 and the associated clamping surface 52 are selected such that the spacing between surfaces 54 and 60 will always assure maximum clamping action at this area as opposed to the clamping action between surfaces 62 and 64. This ensures that the primary diaphragm sealing occurs at surfaces 54, 56 to better accommodate valve purging.

The outer periphery of the diaphragm 36 is further bent and clamped by secondary corners 72 and chamfered corner 70. These corners are effectively axially spaced from one another a distance less than the actual spacing between corners 66 and 68. Thus, the outer peripheral portion of diaphragm 36 is deformed to a greater degree than the deformation that takes place between corners 66 and 68. As fully described in the previously mentioned application, this relationship provides an extremely effective peripheral seal for the diaphragm.

Referring again to FIGS. 2 and 5, it will be noted that the diaphragm 36 includes a central opening 74 which is closely received about a vertically extending collar portion 76 formed on the main body 78 of the stem tip assembly 16. To seal between the stem tip body 78 and the inner periphery 74 of diaphragm 36, a continuous full penetration weld, as shown at 80, is provided completely about the inner periphery of the diaphragm to positively join and seal it to the body 78. In addition, the weld joins all layers of the diaphragm to also prevent any possible leak paths between the layers. Preferably, and in accordance with an aspect of the invention, means are also provided to mechanically clamp the diaphragm 36 to the body 78 at a location radially outwardly of the weld 80. In the embodiment shown, the stem tip body 78 is threadedly connected at 84 to the lower reduced diameter end portion 86 of stem 34. The clamping of the inner periphery of the diaphragm is accomplished by cooperation between an annular clamp ring 82 located beneath the larger diameter portion 88 of stem 34 and the upper surface of the diaphragm 36. As shown, the annular ring 82 has an inner open diameter 90 which is substantially larger than the inner diameter 74 of the diaphragm 36. This assures that when the stem tip body 78 is threadedly tightened on the stem 34 clamping between the under surface of ring 82 and the upper surface of stem tip body 78 takes place at a location significantly outwardly of the weld 80. Preferably distance "D" is predetermined to be sufficiently outwardly of weld 80 to prevent any bending forces generated during reciprocation of the valve and flexure of the diaphragm 36 from being transmitted to the weld 80. This distance may, of course, vary depending upon the size and/or thickness of the diaphragm.

Preferably, the upper surface 92 of stem tip body 78 is smoothly contoured away from the diaphragm as shown. Similarly, the under surface of the clamp ring member 82 is also smoothly contoured away from the upper surface of diaphragm 36. This arrangement allows the clamping forces applied by clamp ring 82 to be concentrated in the area 94 and allows the diaphragm 36 to undergo the required deflection without being subjected to sharp bends or the like.

The overall arrangement and operation of the operating assembly 18 can best be understood by reference to FIG. 1. As shown therein, the bonnet member 50 is provided with an outwardly extending flange like portion 100 which is sized so that its outer periphery 102 is closely and slidably received in the bore section 28. A generally axially extending sleeve portion 104 extends upwardly from flange portion 100. Bonnet member 50 is clampingly retained in the enlarged bore 28 by a bonnet nut member 106 which is threadedly received in bore 28 by cooperating threads 108. The upper end of the bonnet nut member 106 is provided with suitable wrench flats 110 to permit the nut to be tightened and released from the bore 28. In addition, it should be appreciated that tightening the bonnet nut member 110 causes the bonnet member 50 to be moved to the diaphragm clamping position previously discussed.

Figure 4:
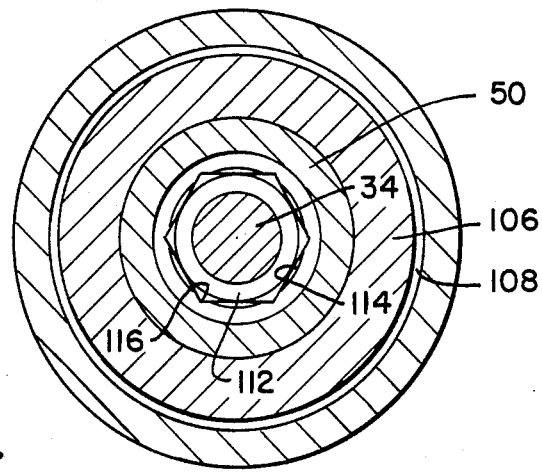
FIG. 4 is a cross-sectional view taken on line 4—4 of FIG. 1.

The stem member 34 extends axially through the bonnet member 50 and the bonnet nut member 106 as shown. Preferably, the stem member 34 is prevented from rotating relative to the bonnet nut member by cooperating surfaces on the stem and the bonnet. Specifically, according to the subject embodiment, the stem 34 (as best shown in FIG. 4) includes a radially extending section 112 which has a generally hexagonal configuration. The bonnet member 50 is provided with a central opening 114 which is broached or otherwise machined to provide longitudinally extending grooves 116 arranged to closely but slidably engage the corners of the hex configuration of portion 112. The grooves 116 thus permit free axial sliding of the stem 34 while preventing any rotational movement.

Selective axial movement of the stem 34 is provided by an actuating member 116 which has a generally cylindrical configuration with an outwardly extending flange 118. The lower end 120 of the actuator 116 is closely received and guided in a bore 122 formed in the sleeve portion 104 of bonnet member 50. The flange portion 118 is sized so as to be closely and rotatably received in the axially extending bore 124 of he bonnet nut member 106. The length of the actuator 116 is such that an upper end portion 126 extends outwardly of the bonnet nut 110. Suitable threads 128 are formed between the exterior of the stem 34 and the interior of the actuating member 116. Preferably, the threads 128 are left-hand threads so that clockwise rotation of the actuating member 116 produces inward or closing movement of stem 34.

In the embodiment shown, the actuating member 116 is continually biased in an outward direction by a spring wave washer 130 positioned between the top of bonnet sleeve 104 and the under surface of flange 118. In addition, a bearing washer 132, formed from bronze or the like, is positioned between the top of flange 118 and the under surface of a radially inwardly extending flange 136 carried by bonnet nut member 106. This arrangement firmly captures and holds the actuating member 116 against axial movement while permitting it to have free driving rotation for adjustment of stem 34.

Selective rotation of the actuating member 116 is provided by handle member 20 which is joined to the outer end 126 of operating member 116. Many different types of handles could be provided; however, according to the subject embodiment, the handle 20 comprises a main handle body 138 which is molded about a metal insert 140. Insert 140 includes a center bore 142 which is sized so as to be closely received on the outer end of actuating member 116. A socket head setscrew or the like 144 is carried in the insert member 140 for connecting the handle 20 to the actuating member 116. As shown, a suitable opening 146 is molded or otherwise formed in the handle body 138 to provide access to the setscrew 144.

Preferably, the stem member 34 has an outer free end 148 which is of a length such that as the valve is moved to an open position the free end 148 of stem 34 extends outwardly of the handle body 138 to provide a visual indication that the valve is in an open position. The stem 148 is sized such that when the valve is in the closed position shown in FIG. 1 the top end of the stem is substantially flush with the top surface of handle 20.

Figure 2:
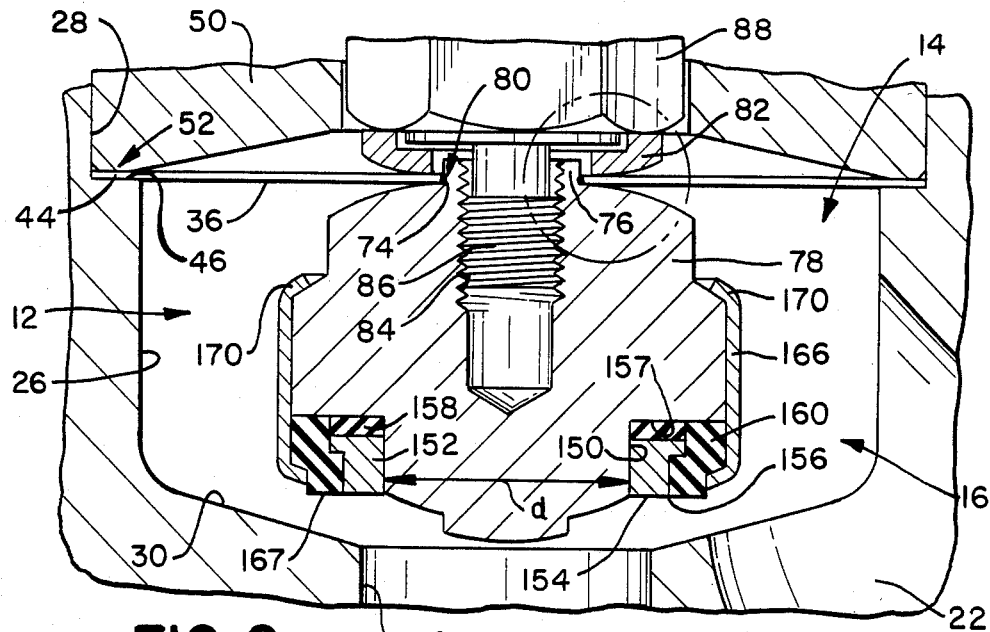
FIG. 2 is an enlarged cross-sectional view of the valve chamber and stem tip assembly of the valve of FIG. 1.
Figure 3:
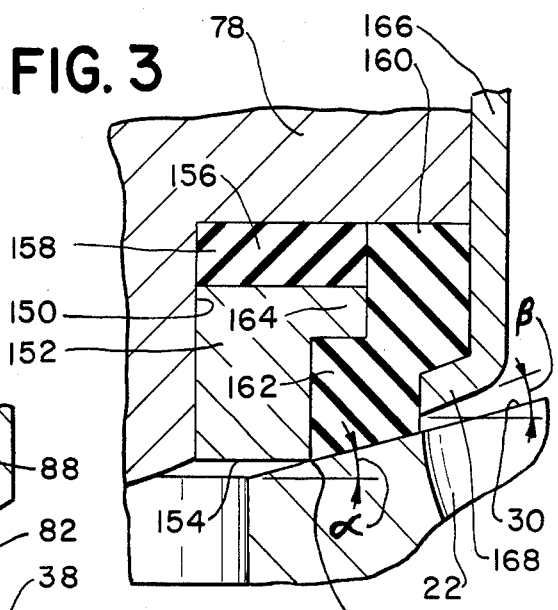
FIG. 3 is greatly enlarged cross-sectional view showing the sealing portion of the stem tip assembly in closed position in engagement with the seat.

The structure and arrangement of the stem tip seal assembly 16 can best be understood by reference to FIGS. 2 and 3. As shown therein, the lower end of stem tip main body 78 is provided with a circumferentially extending recess 150 which opens axially and radially of the body 78. The inner diameter d of recess 150 is slightly less than the diameter of port 24. Carried on the lower end of body 78 and slidably received on the inner wall of recess 150 is a metal seal ring member 152. Ring 152 has a generally flat lower face 154 which terminates in an outer, relatively sharp corner 156. The corner 156 is arranged to engage the inclined bottom wall 30 of valve chamber 26 circumferentially about the port 24 as the valve moves toward a closed position shown in FIG. 3. Corner 156 thus provides a metal-to-metal generally line contact seal about port 24.

Positioned axially inwardly of the ring 152 and captured between the rear of the ring and the axially facing surface 157 of recess 150 is a resilient ring or a washer member 158. In the embodiment under consideration, the ring 158 is formed from virgin polytetrafluoroethylene and is sized so as to substantially completely fill the area or space between ring 152 and surface 157.

Positioned radially outwardly of ring 152 and 158 is a seal ring 160 formed from a suitable resilient, abrasion resistant seal material such as chlorotrifluoroethylene or a filled polytetrafluoroethylene. For reasons which will subsequently be described, ring 160 has a greater stiffness than previously mentioned ring 158. The ring 160 is configured to substantially fill the axially open space between the inner rings 152 and 158 and the outer diameter of the body 78. As shown, ring 160 has a radially inwardly extending portion 162 which extends under a radially outwardly extending flange 164 formed on ring 152. Portion 162 of ring 160 thus acts to axially retain ring 152 in position on body 78. Preferably, and for reasons subsequently to be discussed, the lower or seal face 167 of seal ring 160 is generally coplanar with, or slightly below the corner 156 of ring 152 when the rings are in their assembled position on body 78.

The rings 152 and 160 are retained in position by a circumferentially continuous metal sleeve member 166 which is closely and slidably received on the outer surface of body 78. As illustrated, sleeve member 166 extends downwardly about the outer circumference of seal ring 160 and includes an inwardly extending continuous flange portion 168 which extends under the axially outer portion of ring 160. The sleeve member 166 is slidably retained on the body 78 by radially inwardly extending flanges or tabs 170 (see FIG. 2) which are bent inwardly over a suitable shoulder on body 78. Additionally, and for reasons subsequently to be discussed, the continuous flange portion 168 is preferably inclined at an angle beta which is slightly greater than the angle of inclination alpha of end wall 30 of chamber 12.

With the stem tip assembly 12 arranged as shown, a closing movement of the valve results in contact being made between the seat area and the end face 167 of the resilient seal member 160. As further closing movement takes place, the seal ring 160 is compressed and the outer corner 156 of rigid ring 152 engages the seat area radially inwardly of the seal ring 160. With further closing movement the compressive forces acting between the seal force 167 of the stiffer resilient seal ring 160 increase. The forces between corner 156 of ring 152 and the seat also increase but to a lesser extent because the less stiff and more resilient ring 158 can more readily undergo compression to allow some rearward movement of ring 152 relative to body 78 and ring 160. This allows ring 152 to maintain firm engagement with the seat area while allowing the sealing pressures between surface 167 and the seat to be increased. Additionally, the compressive forces acting within ring 160 maintain a downward force on the sleeve 166 because of the flange portion 168. With the final closing movement of the valve the lower edge of sleeve 166 engages the seat area with line contact circumferentially of seal ring 160. The seal ring 160 is thus confined between the inner rigid ring 152 and the outer sleeve 166. In addition, it should be noted that the inner ring 152 and the outer sleeve 166 make metal-to-metal line contact with the seat and totally confine the resilient seal ring 160.

Figure 7:
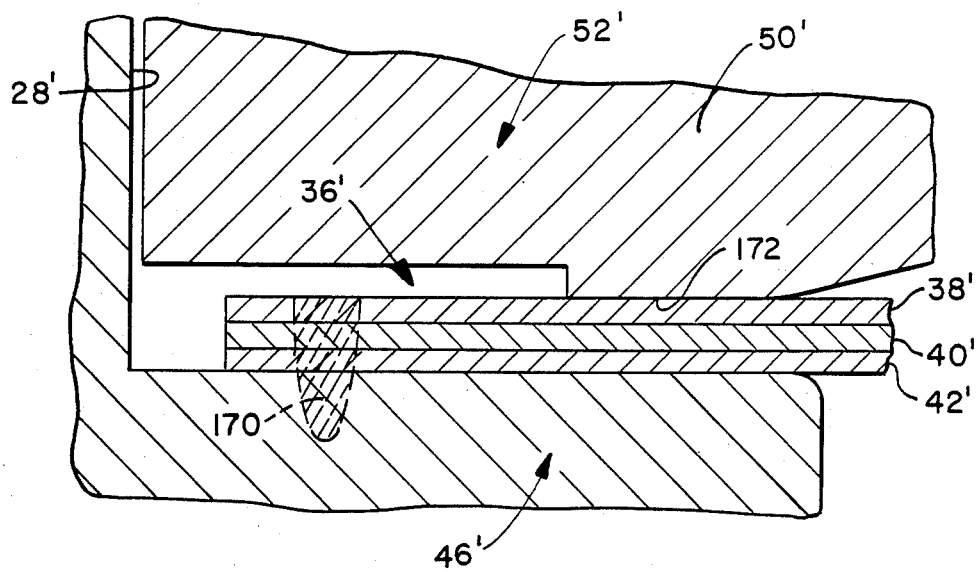

FIG. 7 shows a modified form of mounting and sealing for the outer periphery of the diaphragm to the valve body 10. In the FIG. 7 embodiment, like reference numerals differentiated by a prime suffix (') have been used to identify parts corresponding to those previously described with reference to FIGS. 1-6. The description of such parts is to be taken as equally applicable to those of the FIG. 7 embodiment unless otherwise noted. In particular, in the FIG. 7 embodiment, the shoulder 46' is made flat without the stepped configuration of FIG. 6. The diaphragm 36' rests on the flat shoulder 46' and is continuously welded to the shoulder by a fully penetrating weld 170 located relatively closely to the outer periphery of the diaphragm. This weld firmly attaches and completely seals the individual disk members to each other and the body 10'. The diaphragm is also clamped to the shoulder 46' by a clamp face 172 which extends outwardly from bonnet member 50' to provide a circumferentially continuous, relatively narrow clamping band located radially inwardly of weld 170. Preferably the face 172 extends generally parallel to sholder 46'.

The relationship between the weld 170 and the clamp surface 172 is such that the flexure forces produced in diaphragm 36' during valve operation cannot be transmitted to the weld.

The invention has been described in great detail sufficient to enable one of ordinary skill in the art to make and use the same. Obviously, modifications and alterations of the preferred embodiment will occur to others upon a reading and understanding of the specification. It is intended to include all such modifications and alterations insofar as they come within the scope of the appended claims or the equivalents thereof.

Having thus described the invention, it is now claimed:

1. A stem tip seal for a shut-off valve comprising:
   a valve member mounted for movement axially toward and away from an associated annular valve seat;
   a cylindrical end portion carried by said valve member and extending axially toward said seat, the diameter of said end portion being less than the inner diameter of said seat;
   an annular rigid ring member slidably received on said cylindrical end portion, said ring member having an outer diameter greater than the inner diameter of said seat;
   a generally cylindrical sleeve axially movable independently of said rigid ring member and said valve member and carried by said valve member axially outwardly of said rigid ring member to define an axially open annular chamber between said sleeve and said rigid ring member;
   a resilient seal ring located in said annular chamber and having an end face adapted to engage said seat as said valve member moves axially toward said seat; and,
   means located between said rigid ring and said valve member for allowing said rigid ring member to move axially inwardly relative to said seal ring and said sleeve and for permitting compressive forces between said seal ring and said seat to increase after said rigid ring member engages said seat during such inward movement.

2. A stem tip seal as defined in claim 1 wherein said means comprises a compressible ring located about said end portion between said rigid ring member and said valve member.

3. A stem tip seal as defined in claim 1 wherein said sleeve member has an end face configured to engage said seat with line contact as said valve member moves toward said seat.

4. A stem tip seal as defined in claim 1 wherein compressive forces applied to said seal ring produce axially outward directed forces on said sleeve member.

5. A stem tip seal as defined in claim 1 wherein said rigid ring member is positioned to engage said seat substantially simultaneously with said seal ring as said valve member moves toward said seat.

6. A stem tip seal as defined in claim 5 wherein said rigid ring member is configured to engage said seat with line contact in the area closely adjacent said seal ring.

7. A stem tip seal as defined in claim 5 wherein said seat is inclined at a first angle relative to the path of movement of said valve member and wherein said sleeve member has an end face inclined at a second angle to be engageable with said seat in line contact as said valve member moves toward said seat.

8. A diaphragm valve comprising:
a valve body defining a valve chamber which extends inwardly from the exterior of said body;
a valve operating stem extending from the exterior of said body axially into said chamber; and,
diaphragm means clamped to said body and said stem for sealing said valve chamber while permitting said stem to have limited axial movement in said chamber; said diaphragm means including a plurality of relatively thin, annular metal members positioned in aligned juxtaposed relationship and joined to said stem by a continuous weld extending about their inner periphery to form a unitary diaphragm member, said diaphragm member positioned to extend generally transversely of said valve chamber with said stem extending axially therethrough; first clamp means for sealingly clamping an outer peripheral portion of said diaphragm member to said body circumferentially of said valve chamber, and second clamp means for sealingly clamping an inner peripheral portion of said diaphragm member to said stem circumferentially thereof, said second clamp means engaging and clamping said diaphragm member radially outwardly of the weld to prevent forces produced during flexure of said diaphragm member from acting on said weld.

9. The valve as defined in claim 8 wherein the outer peripheral portion of diaphragm member is welded to said body by a continuous weld located radially inwardly of said first clamp means.

10. A valve as defined in claim 8 wherein said second clamp means comprises a pair of clamp members positioned on axially opposite sides of said diaphragm member, each of said clamp members being carried by said stem and having opposed surfaces facing said diaphragm with said opposed faces curving axially away from said diaphragm.

11. A valve as defined in claim 8 wherein said second clamp means includes an axially extending collar which is received in the center of said annular metal members which define said diaphragm means.

12. A valve as defined in claim 11 including a valve element positioned in said valve chamber and joined to said stem, a portion of said valve element constituting a portion of said second clamp means.

13. A diaphragm valve comprising:
a valve body having an opening which extends inwardly from the exterior of said body to define a valve chamber;
a valve operating stem member extending axially into said valve chamber from a position exteriorly of said body;
a diaphragm having an outer periphery joined to said body and an inner periphery welded to said stem for sealing said valve chamber and permitting said stem to have limited movement axially of said chamber; and,
actuating means for selectively moving said stem, said actuating means including:
a bonnet member through which said stem extends with cooperating surfaces between said bonnet and said stem for permitting axial movement of said stem while preventing axial rotation;
a drive member rotatably carried by said bonnet member in surrounding relationship to said stem member and having threads engaging said stem for producing axial movement of said stem with rotation of said drive member;
a nut member surrounding said bonnet member and said drive member, said nut member threaded into said body and clamping said bonnet member to said body;
bearing means in said nut member engaged with said drive member for preventing axial outward movement of said drive member while permitting axial rotation; and,
handle means positioned over said bonnet member and joined to said drive member with said stem member extending axially through said handle means.

14. The diaphragm valve as defined in claim 13 wherein said bearing means include cooperating shoulders on said drive member and said nut member with an annular bearing ring member positioned therebetween.

15. The diaphragm valve as defined in claim 13 wherein said nut member is axially received in the outer end of said opening and wherein the outer periphery of said diaphragm is clamped between said bonnet and said body.

16. The diaphragm valve as defined in claim 15 wherein said bearing means include spring means for biasing said drive member axially outward of said nut member.

17. The diaphragm valve as defined in claim 16 wherein said spring means are located between said bonnet member and said drive member.

18. The diaphragm valve as defined in claim 16 wherein said drive member extends outwardly of said nut member.

19. The diaphragm valve as defined in claim 18 wherein said bonnet member includes a cylindrical portion which extends into said nut member.

20. The diaphragm valve as defined in claim 19 wherein said bearing means includes a radially extending shoulder formed on said drive member and a cooperating radially extending shoulder formed on said nut member.

* * * * *